United States Patent Office 3,365,642
Patented Jan. 23, 1968

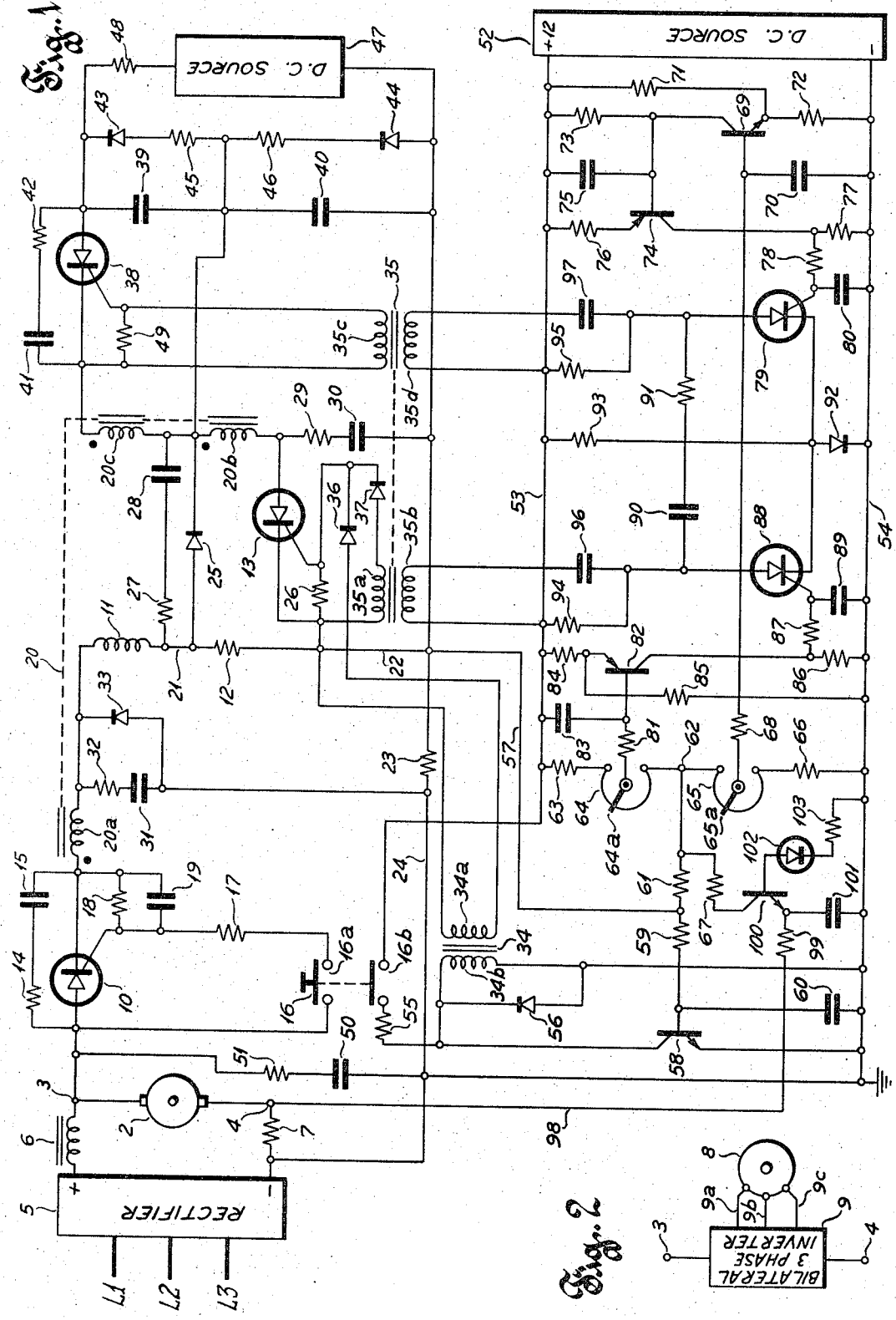

3,365,642
DYNAMIC BRAKING CIRCUIT FOR MOTOR
CONTROL SYSTEM
Robert L. Risberg, Milwaukee, Wis., assignor to Cutler-Hammer, Inc., Milwaukee, Wis., a corporation of Delaware
Filed Oct. 13, 1965, Ser. No. 495,656
12 Claims. (Cl. 318—376)

This invention relates to dynamic braking means for motor control systems and more particularly to dynamic braking circuits using solid state switching.

It is an object of this invention to provide a low cost dynamic braking circuit having a substantially constant current operating characteristic during braking and being particularly suitable for using solid state switching devices.

It is another object of the invention to provide a dynamic braking circuit for a motor controlled by a variable power source, the dynamic braking circuit having means for increasing the current absorbed thereby in response to increases in the regenerated current level in order to keep the motor under the control of the variable power source and further to minimize power losses.

It is still another object of the invention to provide improved solid state switching circuitry suitable for systems of the type heretofore described.

The objects of the invention are accomplished by providing a dynamic braking loop circuit comprising in series, a first switch, an inductance and a power dissipating resistor with a second switch in shunt of the resistor. When the second switch is closed the current in the dynamic braking loop increases. When the second switch is open the regenerated power and the energy stored in the inductance is dissipated in the resistor and the current within the loop decreases. There is further provided improved switching control circuitry for operating the first switch to render the loop operative and for controlling the second switch to maintain the loop current at or near a desired control point. There is also provided means for changing the control point in response to changes in motor regenerated current in order to adjust the power dissipating capacity of the dynamic braking loop.

A more complete understanding of the invention will be had and other objects and advantages of the invention will appear upon referring to the following description and claims.

While the system hereinafter described is adapted to fulfill the objects stated, it is to be understood that it is not intended that the invention be confined to the particular preferred embodiment disclosed, since it is susceptible of various modifications without departing from the scope of the appended claims.

In the drawings:

FIGURE 1 is a motor control system embodying the claimed invention; and

FIG. 2 is a circuit diagram showing a modification of the system illustrated in FIG. 1.

Referring to FIG. 1, there is shown a direct current motor 2 with its terminals connected to D.C. power at connection points 3 and 4. The direct current power supply comprises a rectifier 5 which in turn receives power from three-phase A.C. power conductors L1, L2 and L3. The rectifier 5 may be preferably of the controlled output type. A controlled rectifier system suitable for this purpose is more completely described in the copending R. W. Spink application Ser. No. 248,314, filed Dec. 31, 1962, now Patent No. 3,281,645, and assigned to the present assignee. A controlled rectifier of this type functions to control the speed of the motor by providing a variable controlled voltage power supply. A smoothing inductance 6 is connected in the positive D.C. output between rectifier 5 and point 3. An IR dropping resistor 7 is inserted in the negative D.C. power conductor between the rectifier 5 and point 4.

FIG. 2 shows a variation of the system of FIG. 1. In place of D.C. motor 2, an A.C. motor 8 may be used. As shown in FIG. 2, A.C. motor 8 is supplied through three-phase output conductors 9a, 9b and 9c of a three-phase inverter 9. Inverter 9 is bilateral in that current regenerated by motor 8 is returned to the D.C. supply through points 3 and 4. An inverter exemplary of this type is described in more detail in the copending R. L. Risberg application Ser. No. 381,969, filed July 13, 1964, and assigned to the present assignee.

A dynamic braking loop is connected across the power supply of motor 2. This loop includes a switching silicon controlled rectifier (SCR) 10, an inductor 11, a power dissipating resistor 12, and an SCR 13 connected in shunt of resistor 12. The anode of SCR 10 is connected to point 3 in the positive power supply. A resistor 14 and a capacitor 15 are connected in series from the anode to the cathode of SCR 10 to protect SCR 10 from rapid changes in voltage. SCR 10 is rendered conductive by a gating voltage delivered to its gate by a firing circuit including contacts 16a of a dynamic braking switch 16 and a resistor 17 in series between the anode and gate of SCR 10. A gate resistor 18 and capacitor 19 are connected in parallel between the gate and cathode of SCR 10. The closure of contacts 16a is effective to apply the gating voltage and thereby cause initiation of dynamic braking. Resistors 17 and 18, in series, form a voltage divider to limit the gate voltage to reasonable values. Resistor 17 and capacitor 19 form an RC delay circuit to suppress transients and to limit the rate of increase of the gate voltage upon closure of contacts 16a.

The cathode of SCR 10 connects to a winding 20a of a commutating inductor 20. As indicated by the dashed line, inductor 20 has three windings 20a, 20b and 20c upon a common core. The other side of winding 20a connects to the relatively large inductor 11. A conductor 21 connects inductor 11 to the resistor 12. The other side of resistor 12 is connected to a conductor 22. A dynamic braking loop current signal resistor 23 is inserted between conductor 22 and another conductor 24 which returns to the negative side of rectifier 5.

A switching circuit is connected in shunt of resistor 12. A unidirectional diode 25 has its anode connected to conductor 21 and cathode connected to one side of the second winding 20b of commutating inductor 20. The anode of SCR 13 is connected to the other side of winding 20b and its cathode is connected to conductor 22. A gate resistor 26 is inserted between the gate and cathode of SCR 13. A resistor 27 and a capacitor 28 are connected in series across diode 25 for transient suppression and for diode recovery current. A resistor 29 and a capacitor 30 are connected in series across SCR 13 to protect SCR 13 from rapid changes in voltage.

A capacitor 31 and a resistor 32 are connected in series from conductor 24 to the junction of winding 20a and inductor 11 for transient suppression purposes. A unidirectional conducting diode 33 is connected across capacitor 31 and resistor 32 to provide a free wheeling path for dissipating current induced in inductor 11 upon the turning off of SCR 10.

SCR 13 may be gated from either one or two sources, a secondary winding 34a of a pulse transformer 34 or a secondary winding 35a of a pulse transformer 35. One side of each secondary winding is connected to the cathode of SCR 13. The other side of windings 34a and 35a are connected to the gate of SCR 13 through unidirectional conducting diodes 36 and 37, respectively, which serve to isolate one gating source from the other.

SCR 13 is commutated by the firing of an auxiliary SCR 38. Further, this auxiliary SCR 38 is commutated by the firing of SCR 13. The cathode of SCR 38 is connected to the third winding 20c of commutating inductor 20, which is in turn connected in series with winding 20b. A commutating capacitor 39 connects the anode of SCR 38 with the junction of windings 20b and 20c. Another commutating capacitor 40 connects the cathode of SCR 13 to the junction of windings 20b and 20c. A capacitor 41 in series with a resistor 42 from the cathode to anode of SCR 38 protect SCR 38 from too rapid changes in voltage. A pair of free wheeling diodes 43 and 44 in series, respectively, with resistors 45 and 46 are connected in parallel with capacitors 39 and 40 to dissipate the commutating energy. A D.C. source 47 is connected in series with a charging resistor 48 across capacitors 39 and 40. Source 47 serves to charge commutating capacitor 39 during the "off" period of SCR 38. Capacitor 40 is normally fully charged by the peak voltage appearing across resistor 12 during the "off" period of SCR 13 and trapped by diode 25. Source 47 serves to further charge commutating capacitor 40 during the "off" periods of SCR 13. The pulse transformer 35 has a secondary winding 35c and a primary winding 35d to provide firing pulses to the gate of SCR 38. As indicated by the dashed line, windings 35a, 35b, 35c and 35d are wound upon a common core. A gate resistor 49 is connected in parallel with winding 35c across the cathode and gate of SCR 38.

A capacitor 50 and a resistor 51 are connected across the input to the dynamic braking circuit from point 3 to conductor 24 for the purpose of suppressing transients when the dynamic braking loop is switched "off."

The control circuitry for regulating the operation of the dynamic braking loop is supplied with 12-volt D.C. power from a source 52 through a positive conductor 53 and a negative ground conductor 54. Conductor 54 is connected to conductor 24 to provide a common ground circuit.

When switch 16 is actuated and contacts 16b close, conductor 53 is connected therethrough and through a current limiting resistor 55 to one side of a primary winding 34b of pulse transformer 34. The other side of winding 34b is grounded. A free wheeling diode 56 is connected across the inductive winding 34b. The closure of contacts 16b is thereby effective to deliver an initial firing pulse to the gate of SCR 13. At the same time the closure of contacts 16a cause SCR 10 to switch "on" to render the dynamic braking loop operative. As a result, a conductor 57, which is connected to the more positive side of current signal resistor 23, carries a positive signal to the base of a transistor 58 through a resistor 59 to turn transistor 58 "on." Since the emitter and collector of transistor 58 are connected across the primary winding 34b, the turning "on" of transistor 58 is effective to short out any subsequent pulses which might be transmitted through transformer 34 while the dynamic braking loop is still operating. A capacitor 60 is connected from the base of transistor 58 to ground and together with resistor 59 filters out "noise."

The signal voltage which appears in conductor 57 and represents the dynamic braking loop current is transmitted through a resistor 61 to the midpoint 62 of a voltage divider circuit between conductor 53 and conductor 54 which voltage divider comprises in series a resistor 63, a variable potentiometer 64 with a slider 64a, a variable potentiometer 65 with a slider 65a, and a resistor 66. Ignoring for the moment the effect of signals through a resistor 67, the voltage signal appearing at point 62 varies in proportion of the dynamic braking loop current.

The voltage signal at point 62 may be considered the input to the circuit hereinafter described which is effective to turn "on" the "decrease" SCR 38 when the voltage at point 62 reaches about 6 volts and is further effective to fire the "increase" SCR 13 when the voltage signal at point 62 decreases to about 5 volts. The slider 65a of potentiometer 65 is connected through a signal resistor 68 to the base of an NPN transistor 69. A capacitor 70 is connected between base of transistor 69 and ground conductor 54 for noise suppression. A resistor 71 and a resistor 72 are connected across the 12-volt supply of conductors 53 and 54, and at their junction provide an "off" bias to emitter of transistor 69. A load resistor 73 connects the collector of transistor 69 to the positive conductor 53. The collector of transistor 69 is also connected to the base of a signal inverting PNP transistor 74. A capacitor 75 is connected between the base of transistor 74 and the positive conductor 53 for noise suppression. A resistor 76 connects the emitter of transistor 74 to the positive conductor 53. The collector of transistor 74 is connected to a resistor 77 which, in turn, is connected to conductor 54. Resistor 77 serves to absorb the leakage current of transistor 74. The collector of transistor 74 is also connected through a gate resistor 78 to the gate of a "decrease" pilot SCR 79. A noise suppression capacitor 80 is connected between gate of SCR 79 and ground conductor 54. The aforedescribed circuitry including transistors 69 and 74 is designed so that when the voltage at point 62 increases to about 6 volts, the voltage on slider 65a will be high enough to overcome the "off" bias of transistor 69 and thereby render transistor 69 conductive. This in turn causes transistor 74 to be turned "on" to gate pilot SCR 79.

The slider 64a of potentiometer 64 is connected through a signal resistor 81 to the base of a PNP transistor 82. A noise suppressing capacitor 83 is connected between the positive conductor 53 and the base of transistor 82. A resistor 84 and a resistor 85 are connected in series across the 12-volt supply of conductors 53 and 54 and at the juncture provides an "off" bias to the emitter of transistor 82. A load resistor 86 is connected between the collector of transistor 82 and ground conductor 54. The collector of transistor 82 is also connected through a resistor 87 to the gate of an "increase" pilot SCR 88. A noise suppressing capacitor 89 is connected between the gate of SCR 88 and the ground conductor 54. The aforedescribed circuitry including transistor 82 is designed so that when the signal voltage at point 62 decreases to about 5 volts or less, the voltage on the slider 64a will decrease sufficiently to overcome the "off" bias of transistor 82 and render transistor 82 conductive. The turning "on" of transistor 82 delivers a gating signal to the gate of the "increase" pilot SCR 88.

A commutating capacitor 90 and a resistor 91 are connected in series between the anodes of SCR's 88 and 79 so that when one is turned "on" the other is turned "off." The cathodes of SCR's 88 and 79 are connected together and through a bias diode 92 to the ground conductor 54. A resistor 93 is connected to the positive conductor 53 and to the cathodes of SCR's 88 and 79. A pair of resistors 94 and 95 are connected between the positive conductor 53 and anodes of the respective SCR's 88 and 79 to provide holding current upon the firing thereof. A coupling capacitor 96 connects the anode of SCR 88 to one side of the pulsing transformer primary winding 35b. Similarly, a coupling capacitor 97 connects the anode of SCR 79 to one side of the pulsing transformer primary winding 35d. The other side of windings 35b and 35d are commonly connected to the positive conductor 53.

It can be seen that the control circuitry is designed to regulate the dynamic braking loop current so that the voltage at point 62 is maintained, during normal operation, between the approximate limits of 5 and 6 volts. As the voltage signal at point 62 increases to about 6 volts, the pilot SCR 79 is gated in the manner heretofore described to, in turn, cause the gating of the "decrease" SCR 38. As the signal voltage at point 62 decreases to about 5 volts, the pilot SCR 88 is gated in the manner heretofore described to, in turn, cause the gating of the "increase" SCR 13.

When dynamic braking of motor 2 is initiated by depressing switch 16, SCR 10 is turned "on" to connect the positive side of motor 2 to the dynamic braking loop, and the "increase" SCR 13 is turned "on" in shunt of the energy dissipating resistor 12. With SCR's 10 and 13 both conductive, current flow in the loop is from point 3 through SCR 10, winding 20a, inductor 11, diode 25, winding 20b, SCR 13, signal resistor 23 and conductor 24 to the negative side of rectifier power supply 5. The impedance of the commutating inductor windings 20a and 20b is negligible compared to that of the large inductor 11. The resistance of inductor 11 is very low so that the loop current increases at a rate proportional to the D.C. power supply voltage and inversely proportional to the inductance of inductor 11. This continues until the loop current reaches 110% of the desired constant average current for the loop. The loop current is sensed by the voltage across signal resistor 23. When 110% current is reached, the voltage signal at point 62 reaches about 6 volts and SCR 38 is fired as previously described. When SCR 38 is fired, SCR 13 and SCR 10 are turned "off" by commutation. The current in the inductor 11 must then flow through resistor 12 and the diode 33. As soon as the commutation period is over (about 100 microseconds) SCR 10 again becomes conductive because of the continuous gating voltage delivered thereto as long as contacts 16a are closed. The loop current flow is then through SCR 10, winding 20a, inductor 11, resistor 12, signal resistor 23 and conductor 24. Since resistor 12 is of a sufficiently high value (about 2 per unit) the loop current will decay. When 90% of the desired average loop current is reached, the signal voltage at point 62 reaches about 5 volts and the "increase" SCR 13 is fired. SCR's 10 and 38 are then commutated. After the commutation period, SCR 10 again turns on and the cycle repeats. The current in the loop is thereby maintained at a desired constant average current over a fairly wide range of power voltages from rectifier 5, typically 20 to 1.

If the motor 2 is not regenerating as much current as the dynamic breaking loop absorbs, the D.C. power supply must make up the difference. This results in some power loss but such a loss can usually be tolerated.

There are conflicting considerations in choosing the resistance of resistor 12. It would be desirable that resistor 12 be of a large resistance to minimize the power loss while at low overhauling loads. On the other hand, the resistance of resistor 12 would desirably be small to have large torque absorbing capacity at higher loads without increasing the transient voltage across resistor 12 to values too high for SCR 13.

Preferably the resistor can be chosen to absorb about 50% of rated motor current. Should the motor 2 regenerate more than the 50% current which the loop will absorb, the dynamic braking would be insufficient to hold the load and the controlled output of rectifier 5 would no longer control the motor speed. To overcome this difficulty, means are provided to adjust the control point of the dynamic braking control to increase the current absorbing capacity of the loop when the motor regenerates higher current. For this purpose, a conductor 98 connects to point 4 to sense the voltage signal across the motor current signal resistor 7. Conductor 98 transmits this signal through a resistor 99 to the emitter of an NPN transistor 100. A signal smoothing capacitor 101 is connected between the emitter of transistor 100 and ground conductor 54. The collector of transistor 100 is connected to resistor 67. The base of transistor 100 is connected through a zener diode 102 and a resistor 103 to ground. The zener diode 102 provides an "off" bias to transistor 100 which bias might typically be about 4.5 volts. This bias is selected so that when the motor regenerated current increases to about 40% rated current, transistor 100 will begin to conduct. The resistance of resistors 61 and 67 is low compared to the resistance of resistors 63 and potentiometer 64 in series and to resistor 66 and potentiometer 65 in series. The conduction of transistor 100 will therefore tend to lower the voltage at signal point 62. As a result, a larger signal voltage through conductor 57 will be required to raise point 62 to a voltage within the aforedescribed control range of 5 to 6 volts. A higher dynamic braking loop current is consequently required and the system will regulate the loop current at a point above the original 50% rated motor current, and the loop absorbing capability will stay ahead of the motor regenerated current.

As the motor regenerated current increases, transistor 100 becomes proportionally more conductive and the control point of the braking loop similarly increases. The loop might typically have a maximum absorbing capability of 100% rated current at which point the signal voltage in conductor 57 would be regulated within the range of 10 to 12 volts.

I claim:
1. A motor control system for providing dynamic braking for an electric motor comprising:
   a source of electric power for said motor comprising a pair of direct current power conductors to which power from said motor may be regenerated, and a source of direct current for supplying direct current to said direct current power conductors;
   a dynamic braking circuit connected from one of said diret current power conductors to the other comprising in series, first switching means, inductor means and power dissipating resistor means, said dynamic braking circuit further comprising second switching means connected in shunt of said resistor means;
   whereby the current in said dynamic braking circuit increases at a rate dependent upon the inductance of said inductor means when said first and second switching means are conductive, and the energy stored in said inductor means is dissipated in said resistor means and the current in said dynamic braking circuit decreases at a rate dependent upon the resistance of said resistor means when said second switching means is non-conductive;
   current sensitive means for sensing the magnitude of current flowing through said dynamic braking circuit;
   control circuit means responsive to said current sensitive means for rendering said second switching means conductive when the current in said dynamic braking circuit reaches a preselected minimum current control point and for rendering said second switching means non-conductive when the current in said dynamic braking circuit reaches a preselected maximum current control point to regulate the current in said dynamic braking circuit between said minimum and maximum control points and thereby produce a substantially constant average value of current in said dynamic braking circuit.
2. The invention as defined in claim 1, together with:
   second current sensitive means for sensing the magnitude of current regenerated by said motor; and
   means responsive to said second current sensitive means for adjusting said maximum and minimum control points to increase the average value of current in said dynamic braking circuit in response to increased regenerated current levels.
3. The invention as defined in claim 1, in which:
   said second switching means comprises a silicon controlled rectifier; and
   said control circuit means comprises a third switching means comprising a silicon controlled rectifier, means for commutating said second and third switching means so that when one is turned "on" the other is thereby turned "off," and means for turning "on" said second switching means when the current in said dynamic braking circuit reaches said minimum control point and for turning "on" said third switching means when the current in said dynamic braking circuit reaches said maximum control point.

4. The invention as defined in claim 3 together with:
   second current sensitive means for sensing the magnitude of current regenerated by said motor; and
   means responsive to said second current sensitive means for adjusting said maximum and minimum control points to increase the average value of current in said dynamic braking circuit in response to increased regenerated current levels.

5. The invention as defined in claim 3 in which said first switching means comprises a silicon controlled rectifier, together with:
   additional commutating means for turning "off" said first switching means when either of said second and third switching means are turned "on"; and
   gating means effective substantially continuously during periods in which dynamic braking is desired for turning said first switching means to the "on" condition.

6. The invention as defined in claim 4, together with additional gating means for initially turning "on" said second switching means at the beginning of periods in which dynamic braking is desired.

7. The invention as defined in claim 3 in which said commutating means comprises:
   a commutating inductor with a winding in series with said second switching means and a winding in series with said third switching means;
   a first capacitor in shunt of said second switching means and its series inductor winding;
   a second capacitor in shunt of said third switching means and its series inductor winding; and
   an auxiliary voltage source for charging said first and second capacitors alternately, said capacitors being connected in series with each other and said auxiliary voltage source.

8. The invention as defined in claim 7 together with unidirectional conducting means connected in the circuit in shunt of said resistor means in series with said second switching means between one side of said resistor means and one side of said first capacitor and poled for trapping the voltage charge on said first capacitor resulting from the peak voltage appearing across said resistor means when said second switching means is rendered non-conductive.

9. The invention as defined in claim 5, in which said commutating means and additional commutating means comprise:
   a commutating inductor with a winding in series with said first switching means, a winding in series with said second switching means, and a winding in series with said third switching means;
   a first capacitor in shunt of said second switching means and its series inductor winding;
   a second capacitor in shunt of said third switching means and its series inductor winding; and
   an auxiliary voltage source for charging said first and second capacitors alternately, said capacitors being connected in series with each other and said auxiliary voltage source.

10. The invention as defined in claim 9 together with:
    unidirectional conducting means connected in the circuit in shunt of said resistor means in series with said second switching means between one side of said resistor means and one side of said first capacitor and poled for trapping the voltage charge on said first capacitor resulting from the peak voltage appearing across said resistor means.

11. An electrical energy absorbing circuit for absorbing energy from a pair of direct current conductors comprising:
    inductor means;
    power dissipating resistor means in series with said inductor from one of said direct current conductors to the other;
    first switching means comprising a silicon controlled rectifier connected in shunt of said resistor means;
    second switching means comprising a silicon controlled rectifier;
    current sensitive means for sensing the magnitude of current flowing through said energy absorbing circuit;
    control circuit means responsive to said current sensitive means for rendering said first switching means conductive when the current in said energy absorbing circuit reaches a minimum current control point and for rendering said second switching means conductive when the current in said energy absorbing circuit reaches a maximum current control point to regulate the current in said energy absorbing circuit between said minimum and maximum current control points;
    means for commutating said first and second switching means so that when one is rendered conductive the other is rendered non-conductive comprising:
       a commutating inductor with a winding in series with said first switching means and a winding in series with said second switching means;
       a first capacitor in shunt of said first switching means and its series inductor winding;
       a second capacitor in shunt of said second switching means and its series inductor winding;
       an auxiliary voltage source for charging said first and second capacitors alternately, said capacitors being connected in series with each other and said auxiliary voltage source; and
       unidirectional conducting means connected in the circuit in shunt of said resistor means in series with said first switching means between one side of said resistor means and one side of said first capacitor and poled for trapping the voltage charge on said first capacitor resulting from the peak voltage appearing across said resistor means when said first switching means is non-conductive.

12. The invention as defined in claim 11 together with:
    third switching means comprising a silicon controlled rectifier in series with said inductor means and said resistor means;
    a third winding on said commutating inductor in series with said third switching means for rendering said third switching means non-conductive when either one of said first and second switching means is rendered conductive; and
    gating means effective substantially continuously during periods in which said energy absorbing loop is to be operative for returning said third switching means to a conductive condition.

No references cited.

ORIS L. RADER, *Primary Examiner.*

J. J. BAKER, *Assistant Examiner.*